United States Patent
Tatsuta

[11] Patent Number: 6,108,359
[45] Date of Patent: *Aug. 22, 2000

[54] LASER DIODE MODULE

[75] Inventor: Keiichi Tatsuta, Miyagi-ken, Japan

[73] Assignee: Alps Electric Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/874,592

[22] Filed: Jun. 13, 1997

[30] Foreign Application Priority Data

Jun. 20, 1996 [JP] Japan .................... 8-159754

[51] Int. Cl.⁷ ............... H01S 3/043; G02B 6/42
[52] U.S. Cl. ............................ 372/36; 385/93
[58] Field of Search ................. 372/43, 50, 36; 385/93, 92, 94, 49, 52, 33

[56] References Cited

U.S. PATENT DOCUMENTS

| 4,790,618 | 12/1988 | Abe ............................ 385/93 |
| 5,068,865 | 11/1991 | Ohshima et al. ............ 372/36 |
| 5,353,294 | 10/1994 | Shigeno ...................... 385/93 |
| 5,416,869 | 5/1995 | Yoshino ....................... 385/49 |

FOREIGN PATENT DOCUMENTS 62-226109  10/1987  Japan .

*Primary Examiner*—James W. Davie
*Attorney, Agent, or Firm*—Brinks Hofer Gilson & Lione

[57] ABSTRACT

There is provided a small-diameter LD module which facilitates welding of a ferrule holder and a lens holder. An LD and a lens barrel having a lens press-fitted therein are supported by a lens holder, and a ferrule is supported by a ferrule holder. The diameter of the ferrule holder is set smaller than that of the lens holder. After the optical axes of the lens (and the LD) and an optical fiber are aligned, the lens holder and the ferrule holder are connected at welds, and then, the lens holder and a protective casing are connected at welds.

4 Claims, 2 Drawing Sheets

LASER DIODE MODULE

BACKGROUND OF THE INVENTION

1. Field of the Invention

The present invention relates to a laser diode (LD) module in which an LD and an optical fiber are mounted to align the optical axes thereof.

2. Description of the Related Art

FIG. 2 is a cross-sectional view of a conventional LD module. In FIG. 2, the direction of the optical axis is represented by the Z direction, and the direction orthogonal to the Z direction is represented by the XY direction. An LD 1 is supported by an LD holder 2 at welds 11a and 11b. A lens 3 is supported by a lens barrel 4 through press fitting or the like, and the lens barrel 4 and the LD 1 are supported by a lens holder 5 at welds 12a and 12b. One leading end of an optical fiber 6 is supported by a ferrule 7 through press fitting or the like, and the ferrule 7 is supported by a ferrule holder 8 at welds 13a and 13b. The components on the side of the lens holder 5 and the components on the side of the ferrule holder 8 are thereby combined into one unit.

After the optical axes of the lens 3 (and the LD 1) and the optical fiber 6 are aligned, the lens holder 5 and the ferrule holder 8 are connected at welds 14a and 14b, and then, the ferrule holder 8 and a protective casing 9 are connected at welds 15a and 15b. Adjustment of the optical axes is conducted by connecting a photoreceptor to the other end of the optical fiber 6 and finding the position on the XY plane where the light receiving level of the photoreceptor is highest while the LD 1 is in operation. The protective casing 9 is shaped like a cylinder to cover the above-mentioned components 1 to 8, and is provided with a flange portion 9a for attachment. The ferrule holder 8 is provided with a rubber hood 10 for protecting the optical fiber 6.

In the conventional LD module mentioned above, since the protective casing 9 and the ferrule holder 8 forming an outer housing of the LD module are connected at the welds 15a and 15b, the lens holder 5 is required to be moved in the XY direction relative to the ferrule holder 8 on the side of the protective casing 9 in order to align the optical axes of the lens holder 5 and the ferrule holder 8. Therefore, in consideration of the clearance for the lens holder 5 to be moved in the XY direction and positioned inside the protective casing 9, the inner diameter of the protective casing 9 is required to be at least larger than the sum of the diameter of the lens holder 5 and the above-mentioned positioning clearance. Since the LD 1 has the largest diameter of all the components contained in the protective casing 9, the outer diameters of the lens holder 5 for supporting the LD 1 and the protective casing 9 for covering the lens holder 5 are inevitably large, which results into an increased diameter of the LD module. Particularly, this problem of upsizing the LD module is noticeable in the above-mentioned conventional LD module in which the end surface of the optical fiber 6 is cut at a bevel to prevent light emitted from the LD 1 and reflected by the end surface from returning to the LD 1 because a wide adjustment range (clearance) in the XY direction is needed to make such adjustment that the LD light obliquely entering the end surface of the optical fiber 6 is refracted and advanced in the direction of the optical axis of the optical fiber 6.

In such an LD module, the LD 1 and the optical fiber 6 are required to not be displaced due to outside vibrations during operation. For example, the LD module is subjected to a vibration test based on well-known Bellcore (Bell Communications Research) Standards, in which the LD module is swept in the XY and Z directions at 20 G and 2 kHz to 20 kHz. In the above conventional LD module, since vibrations applied to the flange portion 9a of the protective casing 9 are transmitted in order to the protective casing 9, the welds 15a and 15b, the ferrule holder 8, the welds 14a and 14b, and the lens holder 5, the welds 14a and 14b between the ferrule holder 8 and the lens holder 5 are greatly stressed. Therefore, more welds are needed to maintain enough strength to prevent the ferrule holder 8 and the lens holder 5 from displacing with respect to each other after welding, which makes a welding operation troublesome.

SUMMARY OF THE INVENTION

An object of the present invention is to provide an LD module in which the diameter of a ferrule holder is set smaller than that of a lens holder and in which a protective casing is welded not to the ferrule holder, but to the lens holder.

Since such welding of the protective casing to the lens holder allows the optical axis of the ferrule holder to be adjusted relative to that of the lens holder, no clearance for positioning is needed between the protective casing and the lens holder, which enables the diameter of the LD module to be decreased. Furthermore, the vibrations applied to the protective casing are transmitted in order to the lens holder, welds between the lens holder and the ferrule holder, and the ferrule holder. Since the ferrule holder is not connected to components other than the lens holder, it is possible to reduce the stress due to the vibrations applied to the welds between the lens holder and the ferrule holder. This also decreases the number of welds between the lens holder and the ferrule holder.

An LD module of the present invention comprises a laser diode for emitting laser light, an optical fiber having an end surface on which the laser light is to be incident, a lens for condensing the light emitted from the laser diode to form an image on the end surface of the optical fiber, a lens holder for supporting the laser diode and the lens, a ferrule holder for supporting the optical fiber, and a protective casing for covering the lens holder and the ferrule holder. The diameter of the ferrule holder is set smaller than that of the lens holder, the ferrule holder and the lens holder are connected at end surfaces thereof by welding, and the protective casing and the lens holder are connected by welding.

Though any type of optical fiber may be used, an optical fiber having a beveled end surface is best-suited.

BRIEF DESCRIPTION OF THE EMBODIMENT

Figure 1:
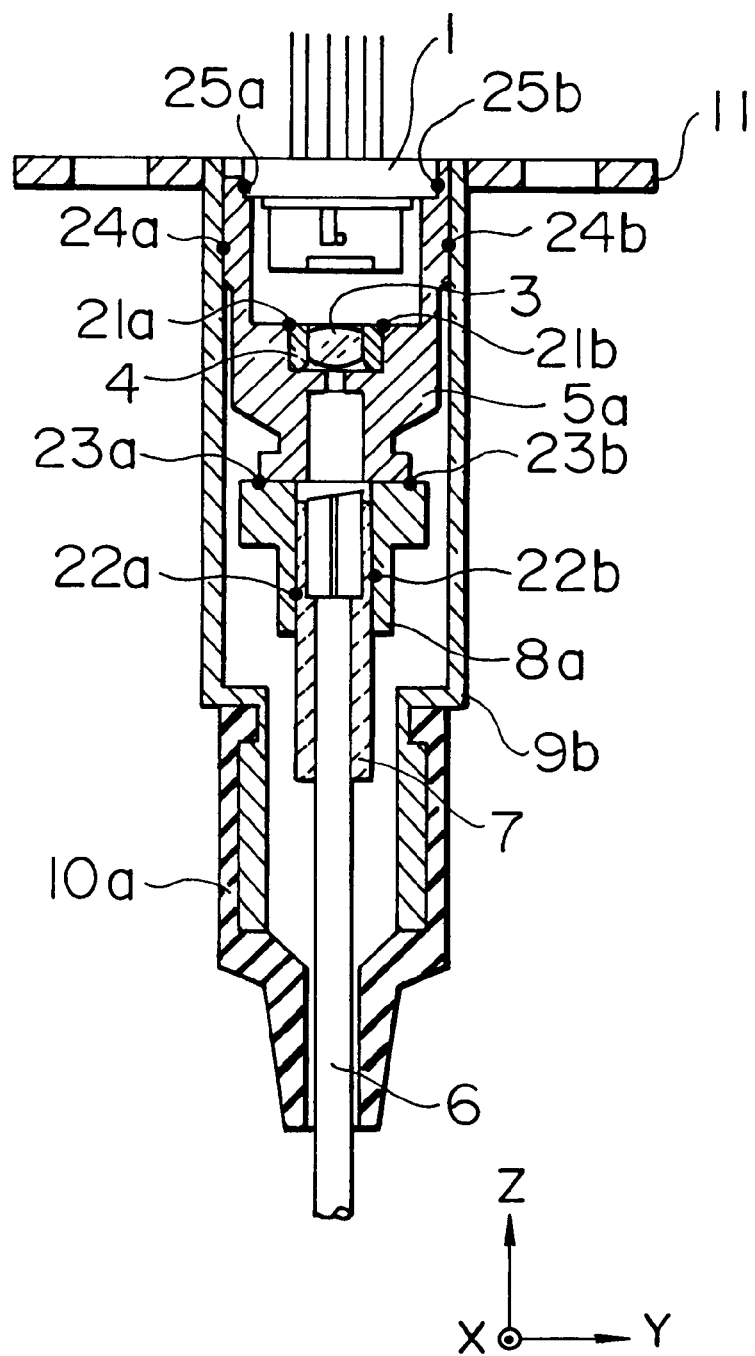
FIG. 1 is a cross-sectional view of an LD module according to an embodiment of the present invention.
Figure 2:
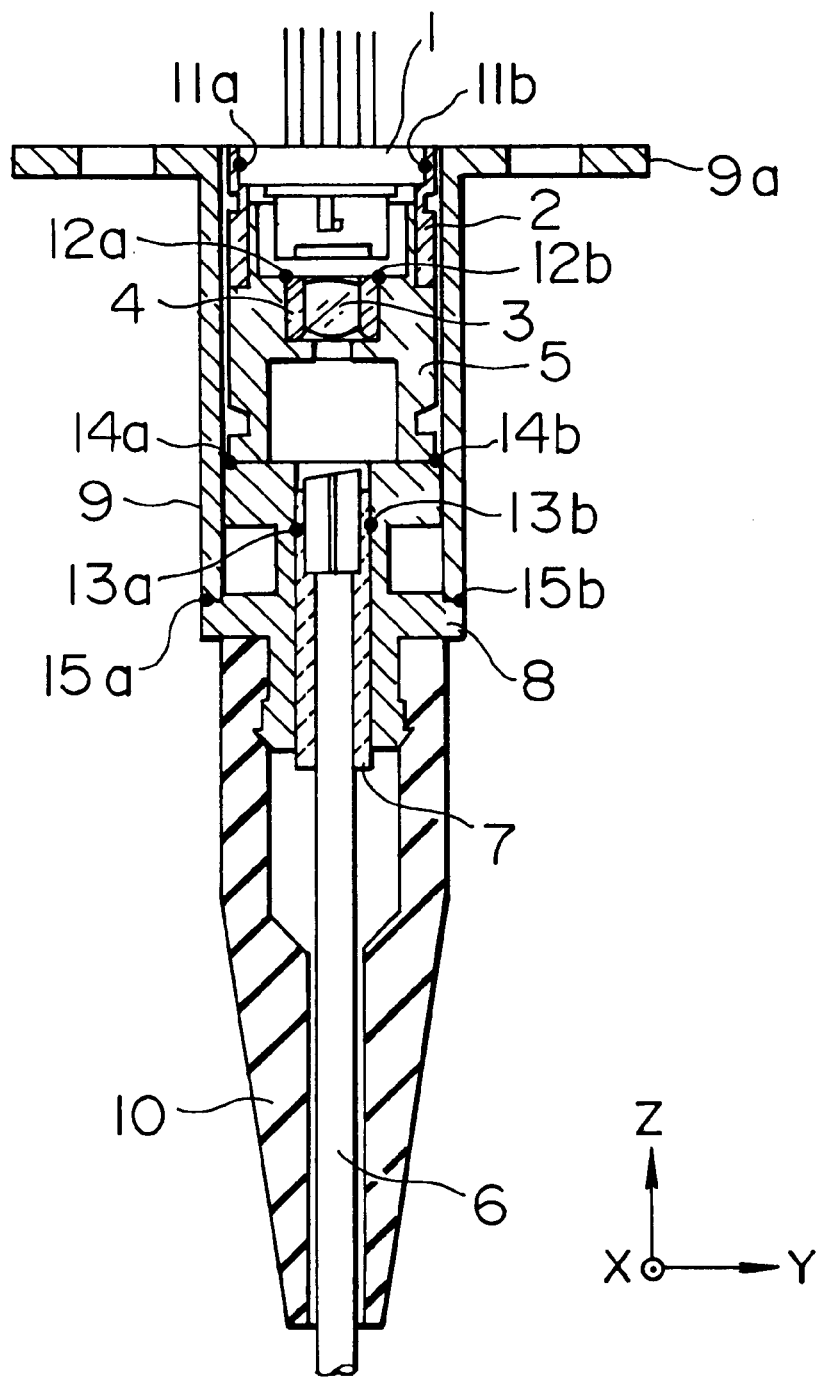
FIG. 2 is a cross-sectional view of an LD module according to the prior art.

An embodiment of the present invention will be described below with reference to the accompanying drawings. FIG. 1 is a cross-sectional view of an LD module according to an embodiment of the present invention, and the same components as those shown in FIG. 2 are denoted by the same numerals.

Referring to FIG. 1, an LD 1 is supported by a lens holder 5a at welds 25a and 25b, and a lens barrel 4 in which a lens 3 is press-fitted is supported by the lens holder 5a at welds 21a and 21b. The leading end of an optical fiber 6 is supported by a ferrule 7 through press fitting or the like, and the ferrule 7 is supported by a ferrule holder 8a at welds 22a and 22b. Thereby, the components on the side of the lens holder 5a and the components on the side of the ferrule holder 8a are combined into one unit. Though the diameter of the ferrule holder 8a is set smaller than that of the lens holder 5a, there is no problem as long as the ferrule holder 8a can support the ferrule 7.

After the optical axes of the lens 3 (and the LD 1) and the optical fiber 6 are aligned, the lens holder 5a and the ferrule holder 8a are connected at welds 23a and 23b, and then, the lens holder 5a and a protective casing 9b are connected at welds 24a and 24b. The protective casing 9b is formed of a metal cylinder to cover the above components 1 to 8, and to prevent undesirable outside impact from being applied to the welds and the like. The protective casing 9b is also provided with a rubber hood 10a for protecting the optical fiber 6. The rubber hood 10a also prevents the entrance of water and dust into the LD module, and reinforces a bent portion of the optical fiber 6. Though the protective casing 9b and a separate attachment plate 11 are combined into one by caulking or the like, these components may be integrally formed.

In the LD module thus constructed, since the protective casing 9b and the lens holder 5a are connected at the welds 24a and 24b, the ferrule holder 8a is moved in the XY direction relative to the lens holder 5a on the side of the protective casing 9b in aligning the optical axes of the lens holder 5a and the ferrule holder 8a. Since the smaller diameter of the ferrule holder 8a than that of the lens holder 5a does not hinder the alignment of the optical axes at all, the diameter of the protective casing 9b is limited only by the lens holder 5a, which can decrease the diameter of the protective casing 9b.

Particularly, since this embodiment employs the optical fiber 6 having the beveled end surface to prevent the light emitted from the LD 1 and reflected by the end surface from returning to the LD 1, a wide area for adjusting the lens holder 5a and the ferrule holder 8a in the XY direction is needed. However, since the ferrule holder 8a having the smaller diameter is moved in the XY direction relative to the lens holder 5a having the larger diameter, a sufficiently wide adjustment area can be achieved.

Though vibrations applied to the attachment plate 11 of the protective casing 9b during operation transmit in order to the protective casing 9b, the welds 24a and 24b, the lens holder 5a, the welds 23a and 23b and the ferrule holder 8a, since the ferrule holder 8a has a free end on the side of the optical fiber 6, it is possible to reduce the stress of the vibrations to be applied to the welds 23a and 23b, and to thereby decrease the number of welds.

The present invention is carried out by the mode mentioned above, and has the advantages described below.

When the diameter of the ferrule holder is set smaller than that of the lens holder and the protective casing is welded not to the ferrule holder, but to the lens holder, since the optical axis of the ferrule holder is adjusted relative to the lens holder, no clearance for positioning is necessary between the protective casing and the lens holder, and thereby the diameter of the LD module can be decreased. Furthermore, the vibrations applied to the protective casing are transmitted in order to the lens holder, welds between the lens holder and the ferrule holder, and the ferrule holder. Since the ferrule holder is not connected to components other than the lens holder, it is possible to reduce the stress due to the vibrations applied to the welds between the lens holder and the ferrule holder. This also decreases the number of welds between the lens holder and the ferrule holder.

When the optical fiber having the beveled end surface is used to prevent the light emitted from the LD and reflected by the end surface from returning to the LD, a wide adjustment area in the XY direction between the lens holder and the ferrule holder is needed. However, since the ferrule holder having the smaller diameter is moved in the XY direction relative to the lens holder having the larger diameter, a sufficiently wide adjustment area can be achieved.

What is claimed is:

1. A laser diode (LD) module, comprising:

a laser diode for emitting laser light;

an optical fiber having an end surface on which the laser light is to be incident;

a ferrule for supporting said optical fiber;

a lens for condensing the light emitted from said laser diode to form an image on the end surface of said optical fiber;

a lens holder for supporting said laser diode and said lens;

a ferrule holder for supporting said ferrule and said optical fiber; and a protective casing for covering said lens holder and said ferrule holder, wherein:

the diameter of said ferrule holder is set smaller than that of said lens holder;

said ferrule holder and said lens holder are directly connected to each other at end surfaces thereof;

one end of said protective casing is free;

said optical fiber extends beyond said free end of said protective casing;

said ferrule and said protective casing are not directly connected to each other;

said ferrule holder and said protective casing are not directly connected to each other; and said protective casing and said lens holder are directly connected to each other.

2. An LD module according to claim 1, wherein the end surface of said optical fiber is cut at a bevel.

3. The laser diode holder of claim 1 wherein one end of the ferrule holder is free.

4. The laser diode module of claim 1 wherein the protective casing is formed of metal.

* * * * *